(12) United States Patent
Liu

(10) Patent No.: US 7,471,474 B2
(45) Date of Patent: Dec. 30, 2008

(54) FINE ADJUSTMENT MECHANISM

(75) Inventor: Kuang-Yao Liu, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 33 days.

(21) Appl. No.: 11/773,440

(22) Filed: Jul. 5, 2007

(65) Prior Publication Data
US 2008/0055749 A1    Mar. 6, 2008

(30) Foreign Application Priority Data
Aug. 29, 2006    (TW) ............................... 95131710 A

(51) Int. Cl.
*G02B 7/02* (2006.01)
(52) U.S. Cl. ...................................... 359/822; 359/823
(58) Field of Classification Search ......... 359/819–824, 359/894
See application file for complete search history.

(56) References Cited

U.S. PATENT DOCUMENTS

2007/0263307 A1* 11/2007 Wu et al. .................... 359/894

* cited by examiner

*Primary Examiner*—Mohammed Hasan
(74) *Attorney, Agent, or Firm*—Jianq Chyun IP Office

(57) ABSTRACT

A fine adjustment mechanism includes a first frame, a carrying portion and a first connecting portion. The first frame has a first opening. The carrying portion is adapted to assemble outside an optical element for fixing it. The carrying portion has a carrying plate disposed in the first opening and extends from the first opening towards a side of the first frame. The first connecting portion is located in the first opening and connected between the carrying plate and the first frame. The first connecting portion is capable of generating an elastic torsion around the axis in a first direction. By using the theorem of elastic torsion, the present invention makes the carrying portion rotate around the axis of the first connecting portion only and is able to avoid the offset problem occurred at the intersection of the axes of the carrying portion and the first connecting portion during adjusting.

17 Claims, 6 Drawing Sheets

FINE ADJUSTMENT MECHANISM

CROSS-REFERENCE TO RELATED APPLICATION

This application claims the priority benefit of Taiwan application Ser. No. 95131710, filed Aug. 29, 2006. All disclosure of the Taiwan application is incorporated herein by reference.

BACKGROUND OF THE INVENTION

1. Field of the Invention

The present invention generally relates to a fine adjustment mechanism, in particular, to a fine adjustment mechanism for carrying optical elements.

2. Description of Related Art

Along with the progress of the modern video technology, an optical projection device has been broadly used in various situations, such as playing a home theater, presentations of a small meeting and workroom discussions. The optical projection device includes an optical engine and a projection lens, wherein the optical engine is for providing an image light beam, while the projection lens is for projecting the image light beam onto a screen to get imaging. Further, the optical engine usually includes a light source, a light integration rod module (LIR module) and a light valve, wherein the light source is for producing a light beam, the LIR module is for homogenizing the light beam and the light valve is for converting the light beam into an image light beam. In general speaking, the homogenized extent of a light beam depends on the relative position between the light beam and a light integration rod (LIR) where the light beam passes through. Therefore, the LIR module is usually equipped with an adjustment unit for adjusting the incidence position of the light beam where the light beam incident into the condenser lens after passing the LIR so as to make the light beam outgoing from the LIR more homogenous.

Referring to FIGS. 1A and 1B, a conventional LIR module 100 includes a LIR 110 and a holder 120. The LIR 110 has a light incident end 112 and a light outgoing end 114 and is fixed in the holder 120 to avoid the LIR 110 from cracking by an external force. The holder 120 includes a alignment element 122, and an optical engine housing 200 has a first raised rib 202a, a second raised rib 202b and a through hole 204. As the LIR module 100 is assembled on the optical engine housing 200, the LIR module 100 is placed on the first raised rib 202a and the second raised rib 202b, and the alignment element 122 is inserted into the through hole 204, wherein the axial displacement in Z direction of the LIR module 100 is restricted by a mutual latching between the alignment element 122 and the through hole 204. Thereafter referring to FIG. 1C, a fixing sheet 212 with four elastic sheets 212a is used to cover the LIR module 100, and by fastening the fixing sheet 212 with four screws 214, the LIR module 100 is fixed on the optical engine housing 200. Herein the first raised rib 202a, the second raised rib 202b and the elastic sheet 212a surround the LIR module 100 and are flat-fittingly in close contact with the LIR module 100, so as to restrict the axial displacements of the LIR module 100 in X direction and Y direction.

Referring to FIGS. 1C and 1D, a first adjusting screw 222 and a second adjusting screw 224 are respectively disposed at the adjacent two sides of the optical engine housing 200 and are adjacent to the light outgoing end 114 of the LIR 110, while a condenser lens 250 is disposed outside the light outgoing end 114. Referring to FIG. 1E, when the center of the light outgoing end 114 departs from the center of the condenser lens 250, the realignment between the center of the light outgoing end 114 and the center of the condenser lens 250 can be achieved by adjusting the first adjusting screw 222 and the second adjusting screw 224. However, during a user turns the first adjusting screw 222 and the second adjusting screw 224, the LIR module 100 may get a rotation of θ around the second raised rib 202b which is served as a pilot at the time. Meanwhile, the light incident end 112 of the LIR 110 in the LIR module 100 would have an offset amount d and the light outgoing end 114 thereof would be lifted from the first raised rib 202a. The offset of the light incident end 112 makes the light beam from the light source fail to be accurately incident at the predetermined position of the light incident end 112 of the LIR 110, which causes a light energy loss after the light beam enters the LIR 110 and moreover affects the evenness of the light beam projected onto a digital micromirror device (DMD).

SUMMARY OF THE INVENTION

Accordingly, an objective of the present invention is to provide a fine adjustment mechanism to avoid a possible offset occurred during fine adjusting the optical elements based on the lever principle.

Another objective of the present invention is to provide a fine adjustment mechanism to solve the offset problem occurred at the light incident end and caused by adjusting the light outgoing end of the LIR, and moreover to solve the problems of the light energy loss and the unevenness of the light beam projected onto a DMD.

To achieve the above-mentioned or other objectives, the present invention provides a fine adjustment mechanism capable of carrying an optical element, and the fine adjustment mechanism includes a first frame, a carrying portion and a first connecting portion. The first frame has a first opening. The carrying portion is adapted to dispose outside the optical element for fixing the optical element. The carrying portion has a carrying plate disposed in the first opening and extends from the first opening towards a side of the first frame. The first connecting portion is located in the first opening and connected between the carrying plate of the carrying portion and the first frame. Herein the first connecting portion is capable of generating an elastic torsion around an axis in a first direction, so that the offset supposedly occurred during fine adjusting the optical elements and based on the lever principle can be avoided.

The carrying portion further includes a solid. The solid is connected to the carrying plate and extends away from a side of the carrying plate. The first connecting portion includes two first connecting columns respectively located at both sides of the carrying portion, and the axis of the first connecting column coincides with the first direction. The first frame, the carrying portion and the first connecting portion are formed integrally, and the materials of the first frame, the carrying portion and the first connecting portion include aluminum alloy.

The fine adjustment mechanism further includes a second frame and a second connecting portion. The second frame has a second opening, while the first frame is located in the second opening. The second connecting portion is connected between the first frame and the second frame, and the second connecting portion is capable of generating an elastic torsion around an axis in a second direction. The second connecting portion includes two second connecting columns respectively located at both sides of the first frame, and the axis of the second connecting column coincides with the second direction. The first direction is perpendicular to the second direction. The second frame further includes a fixing portion. Herein the fixing portion is connected to the second frame, and the fixing portion extends from the bottom of the second frame towards to a side of the second frame. The first frame, the carrying portion, the first connecting portion, the second frame and the second connecting portion are formed integrally. The carrying plate, the first frame and the second frame are disposed on a same plane.

The fine adjustment mechanism further includes an adjustment unit, which is disposed surrounding the carrying portion and capable of pushing the carrying portion. The adjustment unit includes a plurality of adjusting screws.

The optical element is a LIR, a light-reflecting element or a lens. When the optical element is a LIR, the intersection of the axes of the first connecting portion and the second connecting portion is located on the axis of the LIR. The carrying plate has a through hole and a light incident end of the LIR is assembled in the through hole. The LIR has a light incident end and a light outgoing end opposite to the light incident end, the carrying plate has a through hole, the light incident end is assembled in the through hole and the adjustment unit is disposed close to the light outgoing end. The present invention specifies the position of the light incident end of the LIR as a fixing end; and uses the theorem of elastic torsion to adjust the position of the light outgoing end of the LIR. Therefore, the present invention is able to avoid the possible offset of the light incident end occurred during adjusting the LIR in the prior art, and the accompanied problems of the light energy loss and the unevenness of the light beam projected onto a DMD are solved by the present invention as well. Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
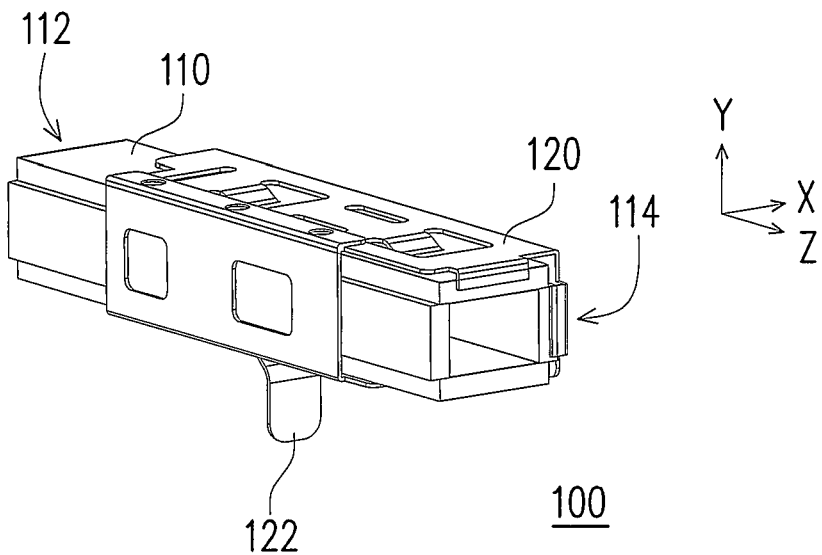
FIG. 1A is a cubic drawing of a conventional LIR module.
Figure 1B:
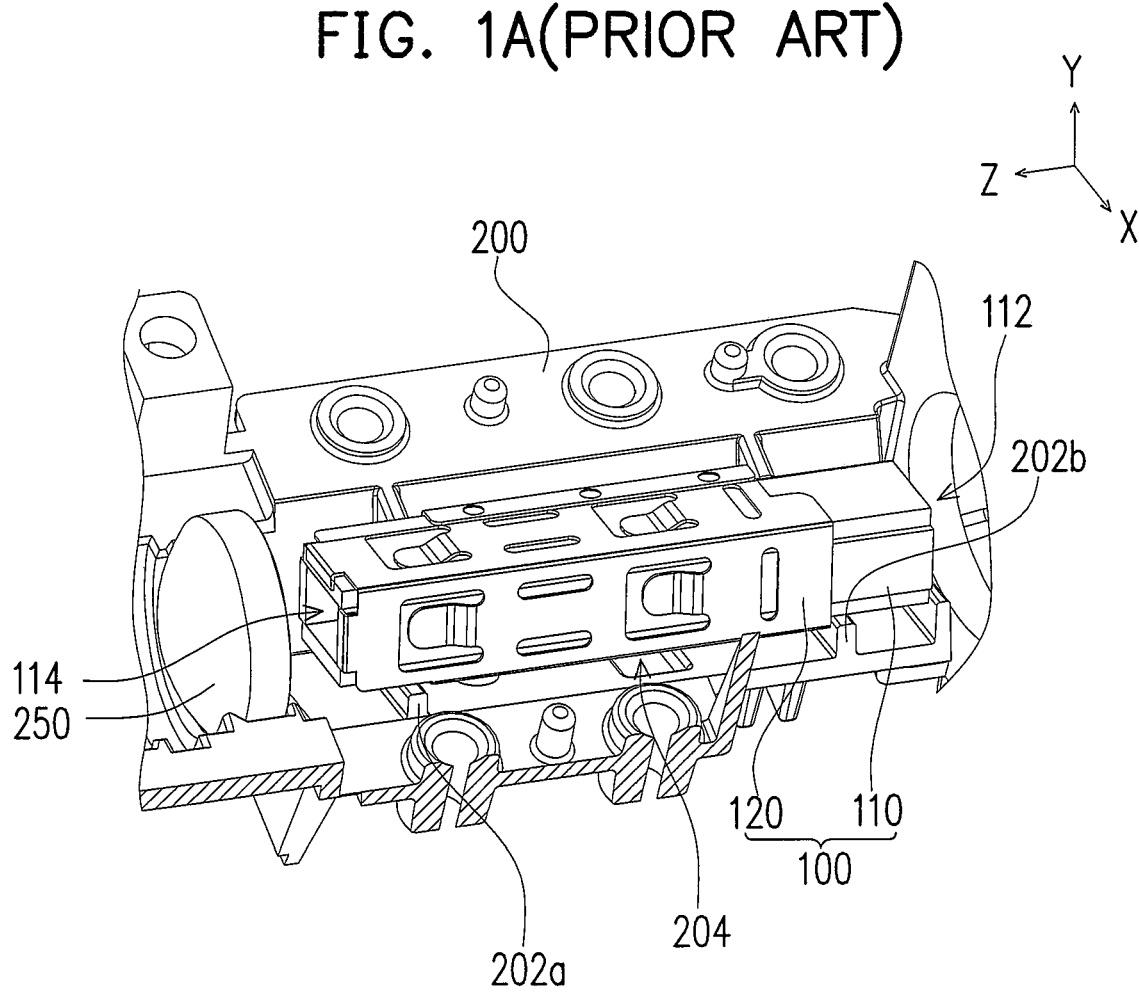
FIG. 1B is a local cubic drawing showing the conventional LIR module in FIG. 1A assembled on an optical engine housing.
Figure 1C:
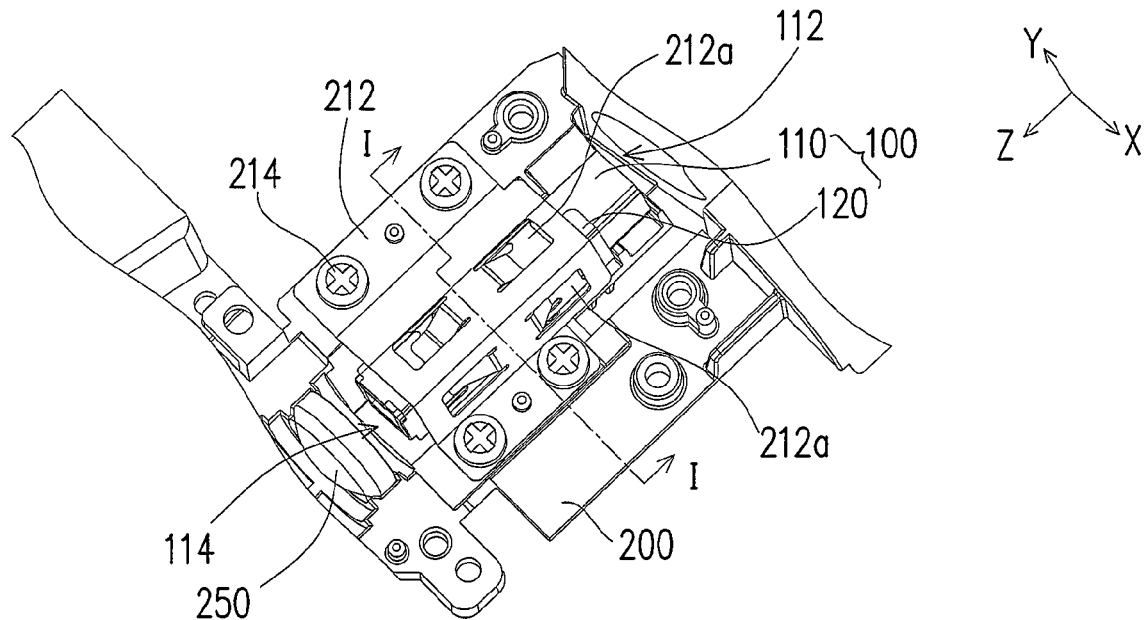
FIG. 1C is a local cubic drawing showing the conventional LIR module in FIG. 1A fixed on an optical engine housing.
Figure 1D:
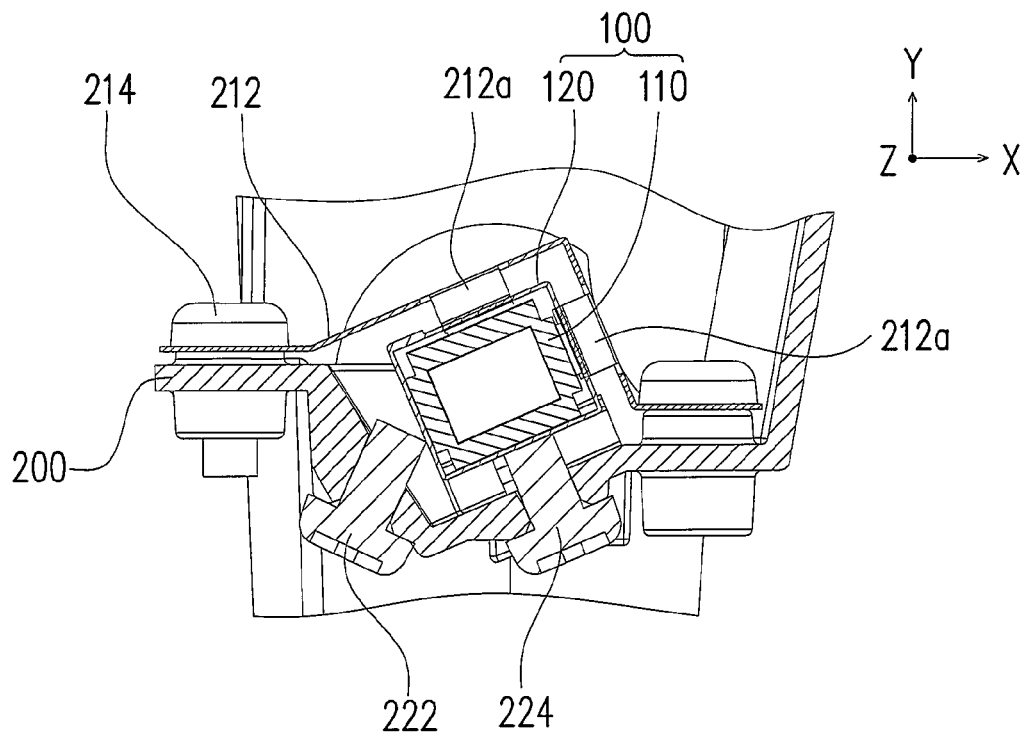
FIG. 1D is a cross-sectional drawing along plane I-I of FIG. 1C.
Figure 1E:
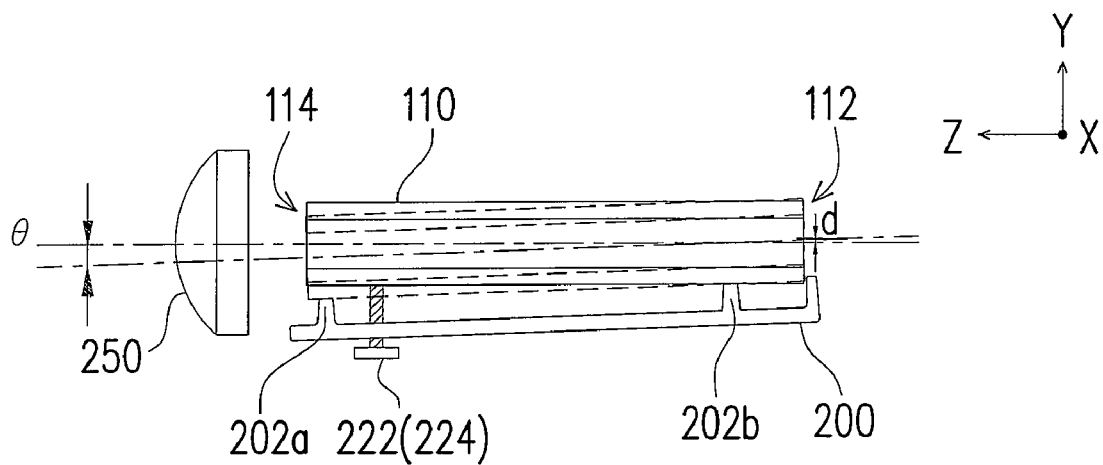
FIG. 1E is a diagram illustrating the LIR in FIG. 1C after adjusting the axis direction thereof by an adjusting screw in comparison with the one before adjusting.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive. Reference will now be made in detail to the present preferred embodiments of the invention, examples of which are illustrated in the accompanying drawings. Wherever possible, the same reference numbers are used in the drawings and the description to refer to the same or like parts.

Figure 2A:
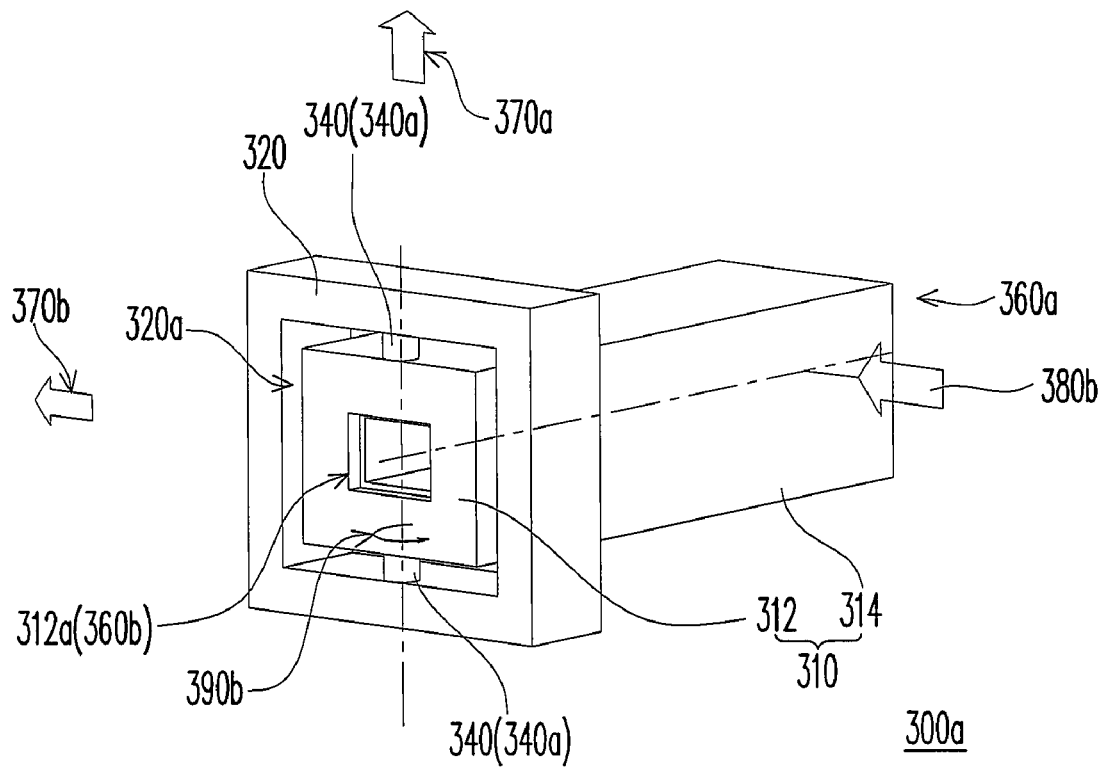
FIG. 2A is a schematic cubic drawing of a fine adjustment mechanism utilized by a LIR according to the first embodiment of the present invention.
Figure 2B:
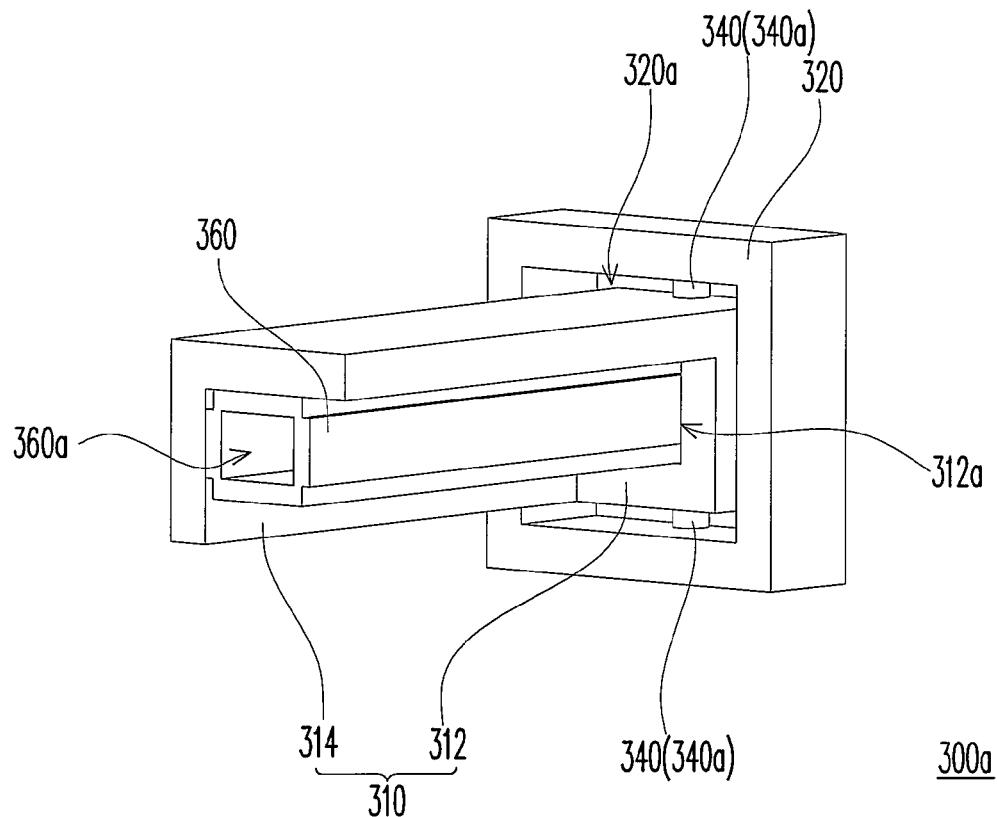
FIG. 2B is another schematic cubic drawing from the other viewing angle of the fine adjustment mechanism in FIG. 2A.

Referring to FIGS. 2A and 2B, a fine adjustment mechanism 300a is capable of carrying an optical element. In a first embodiment of the present invention, the optical element is, for example, a light integration rod (LIR) 360. The LIR 360 has a light incident end 360b and a light outgoing end 360a opposite to the light incident end 360b. The fine adjustment mechanism 300a includes a carrying portion 310, a first frame 320 and a first connecting portion 340. The first frame 320 has a first opening 320a. The carrying portion 310 is adapted to assemble outside the LIR 360 for fixing the LIR 360. The carrying portion 310 has a carrying plate 312 disposed in the first opening 320a, and the carrying portion 310 extends from the first opening 320a towards a side of the first frame 320.

The first connecting portion 340 is located in the first opening 320a and connected between the carrying plate 312 and the first frame 320. In addition, the first connecting portion 340 is capable of generating an elastic torsion around the axis in a first direction 370a.

In the preferred embodiment of the present invention, the carrying portion 310 further has a solid 314 connected to the carrying plate 312, and the LIR 360 is adapted to assemble in the solid 314. The solid 314 extends away from a side of the carrying plate 312 in the direction perpendicular to the carrying plate 312. The carrying plate 312 further has a through hole 312a, in which the light incident end 360b of the LIR 360 is assembled, so as to make the light incident end 360b of the LIR 360 become a fixing end. In the preferred embodiment of the present invention, the carrying plate 312 is a rectangular carrying plate, while the solid 314 is an L-shape solid. Besides, the carrying portion 310, the first frame 320 and the first connecting portion 340 are, for example, formed integrally, and the materials thereof are, for example, aluminum alloy. But the present invention does not limit the carrying plate and the solid to the above mentioned. For example, the carrying plate 312 can be a circular carrying plate or other shapes, and the solid 314 can be a hollow rectangular solid or other solids without interfering the light beam transmission path and capable of containing the LIR 360.

In addition, a shape of the first connecting portion 340 is, for example, a column with an axis coinciding with the first direction 370a, and the first connecting portion 340 is capable of generating an elastic torsion around the axis in the first direction 370a. The carrying plate 312 and the first frame 320 can be disposed on a same plane by using the first connecting portion 340 to connect the carrying plate 312 and the first frame 320 together. In the embodiment of the present invention, the first connecting portion 340 includes two first connecting columns 340a, which are respectively located at both sides of the carrying portion 310. Two ends of the two first connecting columns 340a are respectively connected to both sides opposite to the other of the carrying plate 312, while another two ends of the two first connecting columns 340a are respectively connected to the two inner sides opposite to each other of the first frame 320. The two first connecting columns 340a are coaxial, the axes thereof are parallel to the first direction 370a and the first direction 370a is perpendicular to the axis of the LIR 360. Herein the first connecting columns 340a are capable of generating an elastic torsion around the axis of the first connecting columns 340a.

In more detail, when the first frame 320 is fixed on an optical engine housing (not shown), the center of the light incident end 360b of the LIR 360 is fixed as well. Once the solid 314 of the carrying portion 310 bears a second external force 380b parallel to a second direction 370b, and the second external force 380b acts on the axis of the LIR 360, the second external force 380b generates a second moment 390b on the first connecting columns 340a, and the second moment 390b is a torque. At the point, the first connecting columns 340a respectively get an elastic torsion, which makes the center of the light outgoing end 360a of the LIR 360 move an offset for adjusting the center of the light outgoing end 360a in the second direction 370b. In the above-mentioned embodiment, the first direction 370a is, for example, perpendicular to the second direction 370b, and both the first direction 370a and the second direction 370b are, for example, perpendicular to the axis of the LIR 360.

The fine adjustment mechanism 300a can further include an adjustment unit (not shown) disposed at the carrying portion 310, and the adjustment unit is capable of pushing the carrying portion 310. In the embodiment, the adjustment unit is disposed close to the light outgoing end 360a of the LIR 360, so as to make the light outgoing end 360a of the LIR 360 become an adjusting end. Further, the adjustment unit is capable of pushing the solid 314 of the carrying portion 310 for generating the second external force 380b. The adjustment unit is, for example, an adjusting screw. Note that the present invention is not limited to the above-described embodiment. For example, the first direction 370a and the second direction 370b allow to be non-perpendicular to each other; the fine adjustment mechanism 300a can be installed in a direction opposite to the above-mentioned direction, thus, the carrying plate 312 may be disposed at the light outgoing end 360a of the LIR 360 and served as the fixing end, and the adjustment unit is accordingly disposed at the light incident end 360b of the LIR 360 served as the adjusting end.

It is remarkable that during fine adjustment of the fine adjustment mechanism 300a, only the solid 314 is acted by an external force, while the LIR 360 is free from the external force action, therefore, the LIR 360 would not be cracked or peeled off. Since as the solid 314 is exerted by an external force for adjusting the center of the light outgoing end 360a, the center of the light incident end 360b of the LIR 360 is fixed, therefore, the present invention is able to avoid the possible offset of the light incident end supposedly occurred in prior art when the adjustment unit adjusts the position of the light outgoing end of the LIR, and the accompanied problems of the light energy loss and the unevenness of the light beam projected onto a DMD are solved by the present invention as well.

Figure 3A:
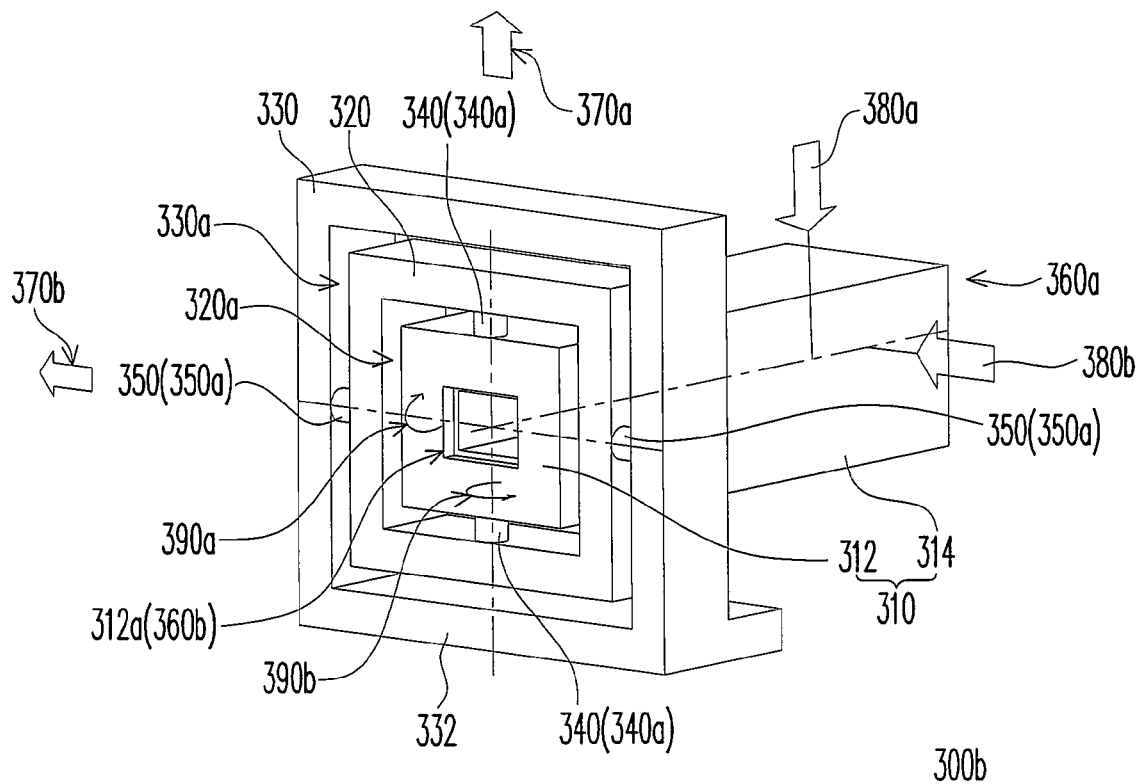
FIG. 3A is a schematic cubic drawing of a fine adjustment mechanism utilized by a LIR according to the second embodiment of the present invention.
Figure 3B:
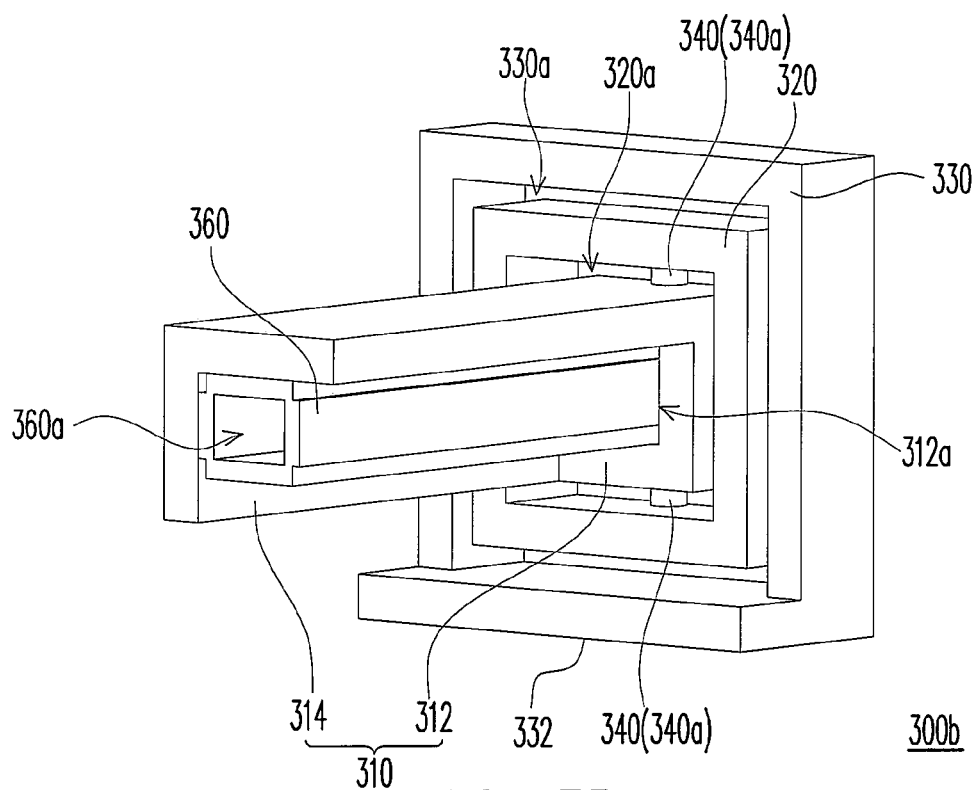
FIG. 3B is another schematic cubic drawing from the other viewing angle of the fine adjustment mechanism in FIG. 3A.

Referring to FIGS. 3A and 3B, the structure of the fine adjustment mechanism 300b in the second embodiment is similar to the fine adjustment mechanism 300a shown in FIGS. 2A and 2B, except the fine adjustment mechanism 300b herein further includes a second frame 330 and a second connecting portion 350. The second frame 330 has a second opening 330a, while the first frame 320 and the second connecting portion 350 are located in the second opening 330a. The shape of the second connecting portion 350 is, for example, a column, and the axis thereof coincides with the second direction 370b. The second connecting portion 350 is connected between the first frame 320 and the second frame 330, so as to make the first frame 320 and the second frame 330 disposed on a same plane by using the second connecting portion 350 to connect the first frame 320 and the second frame 330 together. In this way, the carrying plate 312, the first frame 320 and the second frame 330 are located on the same plane. The second connecting portion 350 is also capable of generating an elastic torsion around the axis in the second direction 370b.

In the embodiment, the second connecting portion 350 includes two second connecting columns 350a, which are respectively located at both sides of the first frame 320. Two ends of the two second connecting columns 350a are respectively connected to the two outer sides opposite to the other of the first frame 320, while another two ends of the two second connecting columns 350a are respectively connected to the two inner sides opposite to each other of the second frame 330. The second connecting columns 350a are coaxial, and the axis thereof is parallel to the second direction 370b, wherein the second direction 370b is perpendicular to the axis of the LIR 360. In addition, the intersection of the axes of the first connecting columns 340a and the second connecting columns 350a is located at the axis of the LIR 360. In this way, the carrying plate 312, the first frame 320, the second frame 330, the axis of the two first connecting columns 340a and the axis of the two second connecting columns 350a are located on the same plane. Similarly, the second connecting columns 350a are capable of generating an elastic torsion around the axis thereof.

In more detail, when the second frame 330 is fixed on the optical engine housing, the center of the light incident end 360b of the LIR 360 is fixed as well. Once the solid 314 of the carrying portion 310 bears a first external force 380a parallel to the first direction 370a, and the first external force 380a acts on the axis of the LIR 360, the first external force 380a would generate a first moment 390a on the second connecting columns 350a, and the first moment 390a is a torque. At this time point, the second connecting columns 350a respectively get an elastic torsion, which makes the center of the light outgoing end 360a of the LIR 360 move the offset for adjusting the center of the light outgoing end 360a in the first direction 370a.

In comparison with the first embodiment, the solid 314 in the second embodiment can simultaneously bear both the first external force 380a and the second external force 380b wherein both the first external force 380a and the second external force 380b are acting on the axis of the LIR 360, so that the center of the light outgoing end 360a can be adjusted in both the first direction 370a and the second direction 370b.

In addition, the second frame 330 can further include a fixing portion 332. The fixing portion 332 connects the second frame 330 and extends from the bottom of the second frame 330 towards a side of the second frame 330. The carrying portion 310, the first frame 320, the second frame 330, the first connecting portion 340, the second connecting portion 350 and the fixing portion 332 are, for example, formed integrally, and the materials thereof are, for example, aluminum alloy. In a preferred embodiment of the present invention, the extending direction of the fixing portion 332 is the same as the extending direction of the solid 314, and they are parallel to each other. Moreover, the fine adjustment mechanism 300b can be assembled on the optical engine housing by using the fixing portion 332.

In comparison with the first embodiment, the fine adjustment mechanism 300b can include two adjustment units. The two adjustment units are respectively disposed at the two adjacent sides of the carrying portion 310 and are capable of pushing the carrying portion 310, so as to make the center of the light outgoing end 360a able to be adjusted simultaneously in both the first direction 370a and the second direction 370b. The structure of the adjustment unit and the actuation manner thereof are the same as the first embodiment, so that it is omitted to describe for simplicity.

Note that except for carrying the LIR 360, the fine adjustment mechanism of the present invention may carry other optical elements to be fine adjusted (for example, a light-reflecting element or a lens), even other components. In the following, another two embodiments are further provided.

Figure 4A:
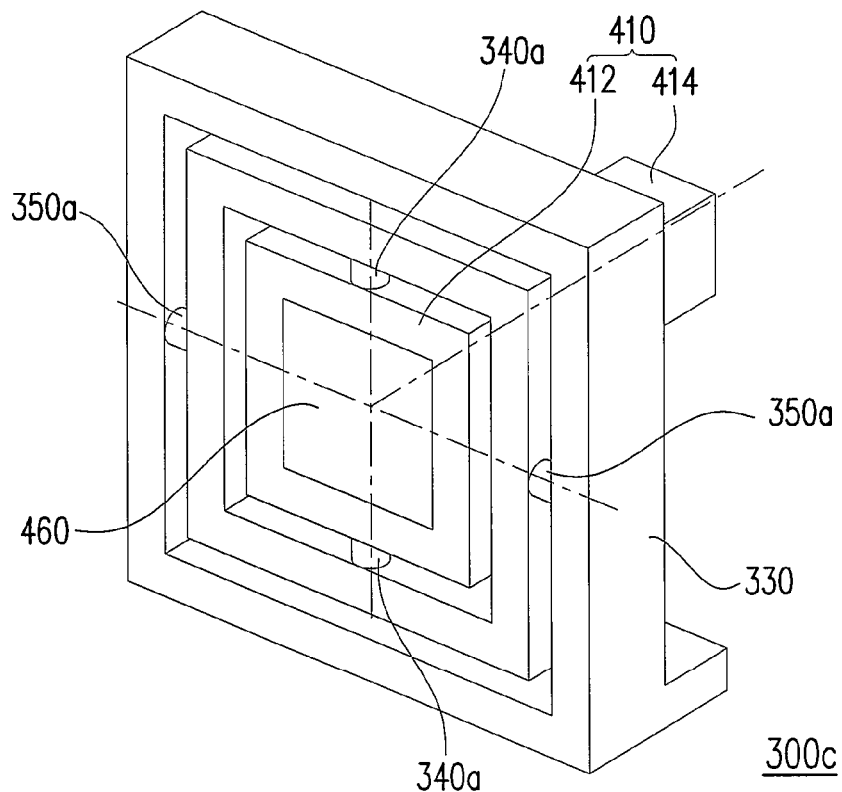
FIG. 4A is a schematic cubic drawing of a fine adjustment mechanism utilized by a light-reflecting element according to the third embodiment of the present invention.
Figure 4B:
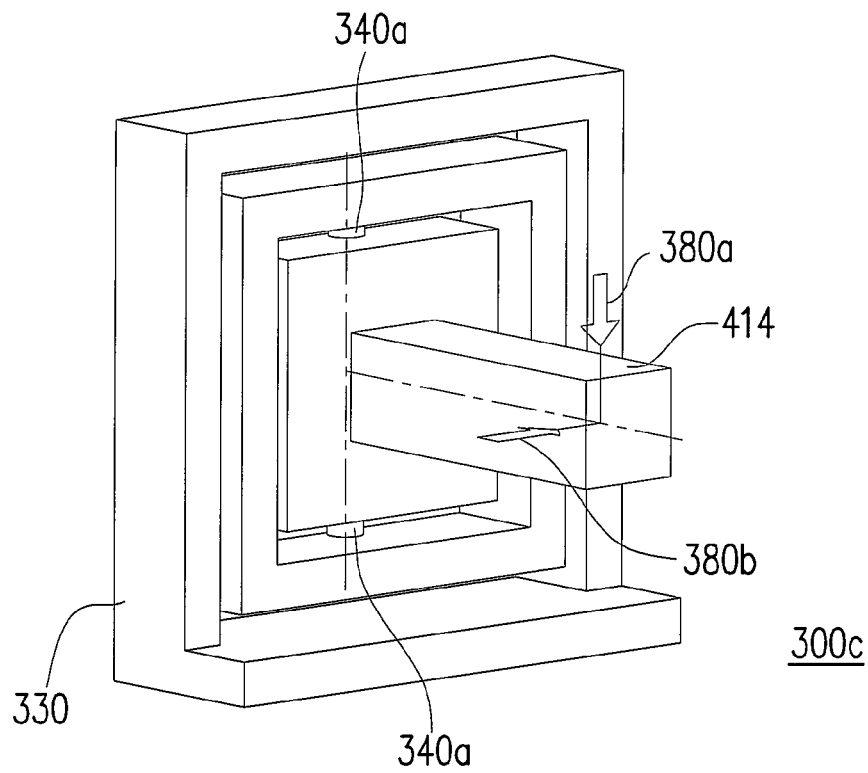
FIG. 4B is another schematic cubic drawing from the other viewing angle of the fine adjustment mechanism in FIG. 4A.
Figure 5:
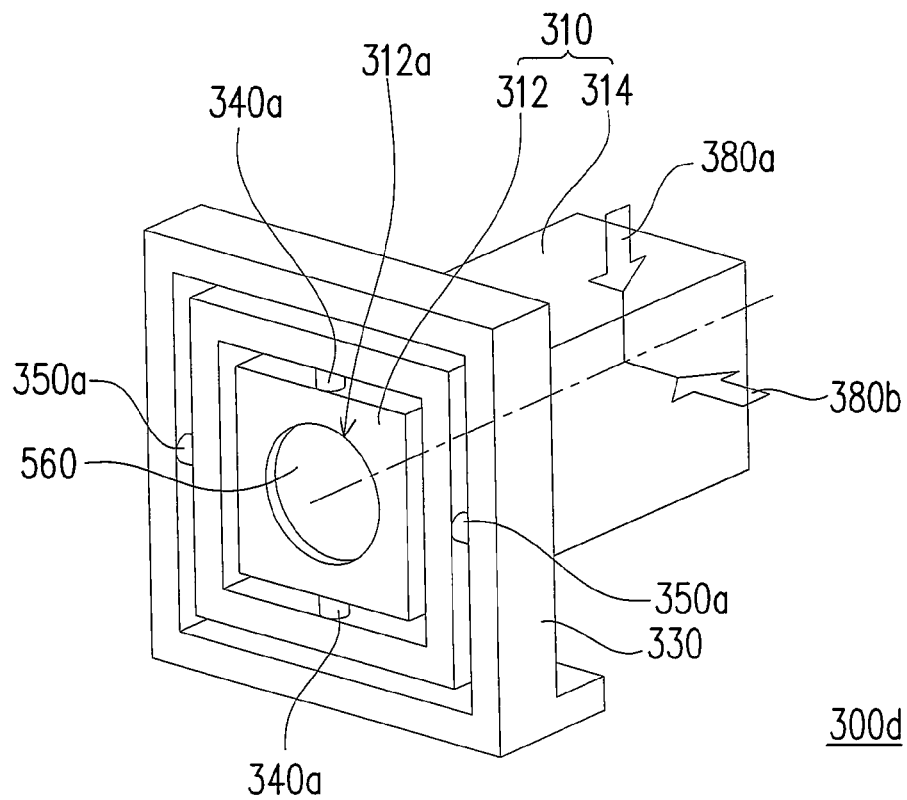
FIG. 5 is a schematic cubic drawing of a fine adjustment mechanism utilized by a lens according to the fourth embodiment of the present invention.

Referring to FIGS. 4A and 4B, the structure of the fine adjustment mechanism 300c in the third embodiment is similar to the fine adjustment mechanism 300b shown in FIGS. 3A and 3B, except the fine adjustment mechanism 300c is capable of carrying a light-reflecting element 460, wherein the light-reflecting element 460 is, for example, a light-reflecting mirror, the light-reflecting element 460 is disposed on the carrying plate 412 and the solid 414 is solid. Referring to FIG. 5, the structure of the fine adjustment mechanism 300d in the fourth embodiment is similar to the fine adjustment mechanism 300b shown in FIGS. 3A and 3B, except the fine adjustment mechanism 300d is capable of carrying a lens 560, and the lens 560 is disposed in the through hole 312a of the carrying plate 312. The actuation manners of the fine adjustment mechanisms 300c and 300d are the same as the fine adjustment mechanism 300b, therefore, it is omitted to describe for simplicity.

In summary, the fine adjustment mechanism of the present invention is designed on the basis of the principle that when the axis of the carrying portion is exerted by an external force, thus, both the first connecting columns and the second connecting columns would get an elastic torsion, respectively. Accordingly, after exerted by a force, the carrying portion would be rotated around a fixing point only, i.e. the intersection of the axes of the first connecting columns and the second connecting columns, without generating a displacement. In this way, the present invention is able to prevent the offset problem during adjusting the fine adjustment mechanism thereof. In addition, when the fine adjustment mechanism of the present invention is applied to a LIR, the problems of the light energy loss and the unevenness of the light beam projected onto a digital micro-mirror device (DMD) caused by the offset are also avoided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fine adjustment mechanism, capable of carrying an optical element; the fine adjustment mechanism comprising:
   a first frame, having a first opening;
   a carrying portion, adapted to assemble outside the optical element for fixing the optical element, wherein the carrying portion has a carrying plate, and the carrying plate is disposed in the first opening; and
   a first connecting portion, located in the first opening and connected between the carrying plate and the first frame, wherein the first connecting portion is capable of generating an elastic torsion around the axis in a first direction.

2. The fine adjustment mechanism according to claim 1, wherein the carrying portion further comprises a solid connected to the carrying plate and extends away from a side of the carrying plate.

3. The fine adjustment mechanism according to claim 1, wherein the first connecting portion comprises two first connecting columns respectively located at both sides of the carrying portion and the axes of the first connecting columns coincide with the first direction.

4. The fine adjustment mechanism according to claim 1, wherein the first frame, the carrying portion and the first connecting portion are formed integrally.

5. The fine adjustment mechanism according to claim 1, wherein the materials of the first frame, the carrying portion and the first connecting portion comprises aluminum alloy.

6. The fine adjustment mechanism according to claim 1, further comprising:
   a second frame, having a second opening, wherein the first frame is located in the second opening; and
   a second connecting portion, connected between the first frame and the second frame and capable of generating an elastic torsion around the axis in a second direction.

7. The fine adjustment mechanism according to claim 6, wherein the second connecting portion comprises two second connecting columns respectively located at both sides of the first frame, and the axes of the second connecting columns coincide with the second direction.

8. The fine adjustment mechanism according to claim 6, wherein the first direction is perpendicular to the second direction.

9. The fine adjustment mechanism according to claim 6, wherein the second frame further comprises a fixing portion connected to the second frame, wherein the fixing portion extends from the bottom of the second frame towards a side of the second frame.

10. The fine adjustment mechanism according to claim 6, wherein the first frame, the carrying portion, the first connecting portion, the second frame and the second connecting portion are formed integrally.

11. The fine adjustment mechanism according to claim 6, wherein the carrying plate, the first frame and the second frame are disposed on a same plane.

12. The fine adjustment mechanism according to claim 6, wherein the optical element is a light integration rod, a light-reflecting element or a lens.

13. The fine adjustment mechanism according to claim 12, wherein the intersection of the axes of the first connecting portion and the second connecting portion is located on the axis of the light integration rod.

14. The fine adjustment mechanism according to claim 12, wherein the carrying plate has a through hole and a light incident end of the light integration rod is assembled in the through hole.

15. The fine adjustment mechanism according to claim 1, further comprising an adjustment unit disposed surrounding the carrying portion and capable of pushing the carrying portion.

16. The fine adjustment mechanism according to claim 15, wherein the adjustment unit comprises a plurality of adjusting screws.

17. The fine adjustment mechanism according to claim 15, wherein the optical element comprises a light integration rod, the light integration rod has a light incident end and a light outgoing end opposite to the light incident end, the carrying plate has a through hole, the light incident end is assembled in the through hole and the adjustment unit is disposed close to the light outgoing end.

* * * * *